US012534952B2

(12) United States Patent

Gargiulo et al.

(10) Patent No.: US 12,534,952 B2
(45) Date of Patent: Jan. 27, 2026

(54) STRUCTURAL, GLASS-ALUMINUM FACADE COMPONENT

(71) Applicant: LA TECNICA NEL VETRO S.P.A., Pimonte (IT)

(72) Inventors: Ferdinando Gargiulo, Pimonte (IT); Marilena Esposito, Pimonte (IT)

(73) Assignee: LA TECNICA NEL VETRO S.P.A., Pimonte (IT)

( * ) Notice: Subject to any disclaimer, the term of this patent is extended or adjusted under 35 U.S.C. 154(b) by 943 days.

(21) Appl. No.: 17/580,203

(22) Filed: Jan. 20, 2022

(65) Prior Publication Data

US 2022/0228425 A1 Jul. 21, 2022

(30) Foreign Application Priority Data

Jan. 20, 2021 (IT) ........................ 102021000000911

(51) Int. Cl.
*E06B 1/60* (2006.01)
*C03B 27/00* (2006.01)
(Continued)

(52) U.S. Cl.
CPC ............ *E06B 3/5436* (2013.01); *C03B 27/00* (2013.01); *E06B 3/66342* (2013.01)

(58) Field of Classification Search
CPC ........ E06B 1/16; E06B 1/6007; E06B 3/5418; E06B 3/5436; E06B 3/5445;
(Continued)

(56) References Cited

U.S. PATENT DOCUMENTS 4,680,206 A * 7/1987 Yoxon ........................ E06B 3/66 428/34
5,540,514 A * 7/1996 Demars ................. E06B 3/5436 52/235
(Continued)

FOREIGN PATENT DOCUMENTS

DE 3934162 A1 * 7/1990 ........... E06B 3/6617
DE 19859888 A1 * 7/2000 ....... B32B 17/10055
(Continued)

OTHER PUBLICATIONS

Machine Translation of DE102009044770A1; https://translationportal.epo.org/emtp/translate/?ACTION=description-retrieval&COUNTRY=DE&ENGINE=google&FORMAT=docdb&KIND=A1&LOCALE=en_EP&NUMBER=102009044770&SRCLANG=de&TRGLANG=en (Year: 2025).*
(Continued)

*Primary Examiner* — Ryan D Kwiecinski
(74) *Attorney, Agent, or Firm* — Ferguson Case Orr Paterson

(57) ABSTRACT

A façade component (1) comprises a glass window (2) and a secondary frame (3) connected to the glass window (2) by means of a plurality of connectors (4), wherein the glass window (2) comprises a multilayer panel (5), the secondary frame (3) comprises a plurality of secondary profiles (13) forming an engagement surface (15) facing the glass window (2), a first gasket seat (18) formed in the engagement surface (15) and accommodating a first gasket (19) interposed between the engagement surface (15) and the glass window (2), an engagement seat (20) forming a plurality of engagement holes (21), each receiving an engagement portion (22) of one of the connectors (4), wherein the connectors (4) comprise an expansion portion (24) anchored in an expansion hole (25) of the glass window (2), a pin (23) connected to the expansion portion (24) and forming the
(Continued)

engagement portion (22), as well as a releasable tightening member (27) which engages the engagement portion (22) of the connector (4) and the engagement seat (20) of the secondary frame (3) and tightens the glass window (2) against the secondary frame (3), wherein the expansion hole (25) and the expansion portion (24) extend through the first glass sheet (7) bordering with the secondary frame (3), and into a second glass sheet (8) adjacent to the first glass sheet (7) on a side opposite to the secondary frame (3), and the expansion hole (25) and the expansion portion (24) have at least one local widening (26, 70) which creates an anti-removal shape coupling between the connector (4) and the glass window (2).

12 Claims, 9 Drawing Sheets

(51) Int. Cl.

| | |
|---|---|
| ***E04B 2/88*** | (2006.01) |
| ***E06B 3/54*** | (2006.01) |
| ***E06B 3/66*** | (2006.01) |
| ***E06B 3/663*** | (2006.01) |

(58) Field of Classification Search

CPC ............... E06B 3/5481; E06B 3/66314; E06B 3/66342; E06B 2007/145; E04B 2/88; E04B 2/885

USPC ............................................................ 52/235

See application file for complete search history.

(56) References Cited

U.S. PATENT DOCUMENTS

| | | | | | |
|---|---|---|---|---|---|
| 5,893,245 | A * | 4/1999 | Sekiguchi | F16B 19/1054 52/656.1 | |
| 6,138,419 | A * | 10/2000 | Sekiguchi | E04F 13/0816 52/235 | |
| 2008/0005983 | A1 * | 1/2008 | Lin | E06B 3/5436 52/235 | |
| 2022/0228425 | A1 * | 7/2022 | Gargiulo | C03B 27/00 | |

FOREIGN PATENT DOCUMENTS

| | | | | |
|---|---|---|---|---|
| DE | 29920612 U1 * | 4/2001 | E06B 3/66342 |
| DE | 102004024320 A1 * | 12/2004 | E06B 3/5436 |
| DE | 102009044770 A1 * | 6/2011 | E06B 3/5436 |
| EP | 0319695 A1 * | 6/1989 | E06B 3/5427 |
| EP | 0340089 A1 * | 11/1989 | E06B 3/5436 |
| EP | 0367908 | 5/1990 | |
| EP | 0367908 A1 * | 5/1990 | B32B 17/10091 |
| EP | 0319695 | 5/1992 | |
| EP | 0340089 | 7/1992 | |
| EP | 1114909 A1 * | 7/2001 | E06B 3/5436 |
| EP | 2006465 A2 * | 12/2008 | B32B 17/10293 |
| EP | 3936326 A1 * | 1/2022 | A47B 96/205 |
| FR | 2654452 A1 * | 5/1991 | E06B 3/5436 |
| FR | 2775707 A1 * | 9/1999 | B32B 17/10293 |
| KR | 20140060182 A * | 5/2014 | E04B 2/90 |
| WO | WO-9622443 A1 * | 7/1996 | B32B 17/10036 |
| WO | WO-0202899 A1 * | 1/2002 | E04F 13/145 |
| WO | WO-03033848 A2 * | 4/2003 | E06B 3/5436 |
| WO | WO-2005028777 A1 * | 3/2005 | E04F 13/0835 |

OTHER PUBLICATIONS

Machine Translation of EP0340089; https://translationportal.epo.org/emtp/translate/?ACTION=description-retrieval&COUNTRY=EP&ENGINE=google&FORMAT=docdb&KIND=A1&LOCALE=en_EP&NUMBER=0340089&SRCLANG=fr&TRGLANG=en (Year: 2025).*

Machine Translation of EP0367908A1; https://translationportal.epo.org/emtp/translate/?ACTION=description-retrieval&COUNTRY=EP&ENGINE=google&FORMAT=docdb&KIND=A1&LOCALE=en_EP&NUMBER=0367908&SRCLANG=de&TRGLANG=en (Year: 2025).*

Italian Search Report, Issued in 102021000000911, Mailed in Sep. 28, 2021.

* cited by examiner

FIG. 10
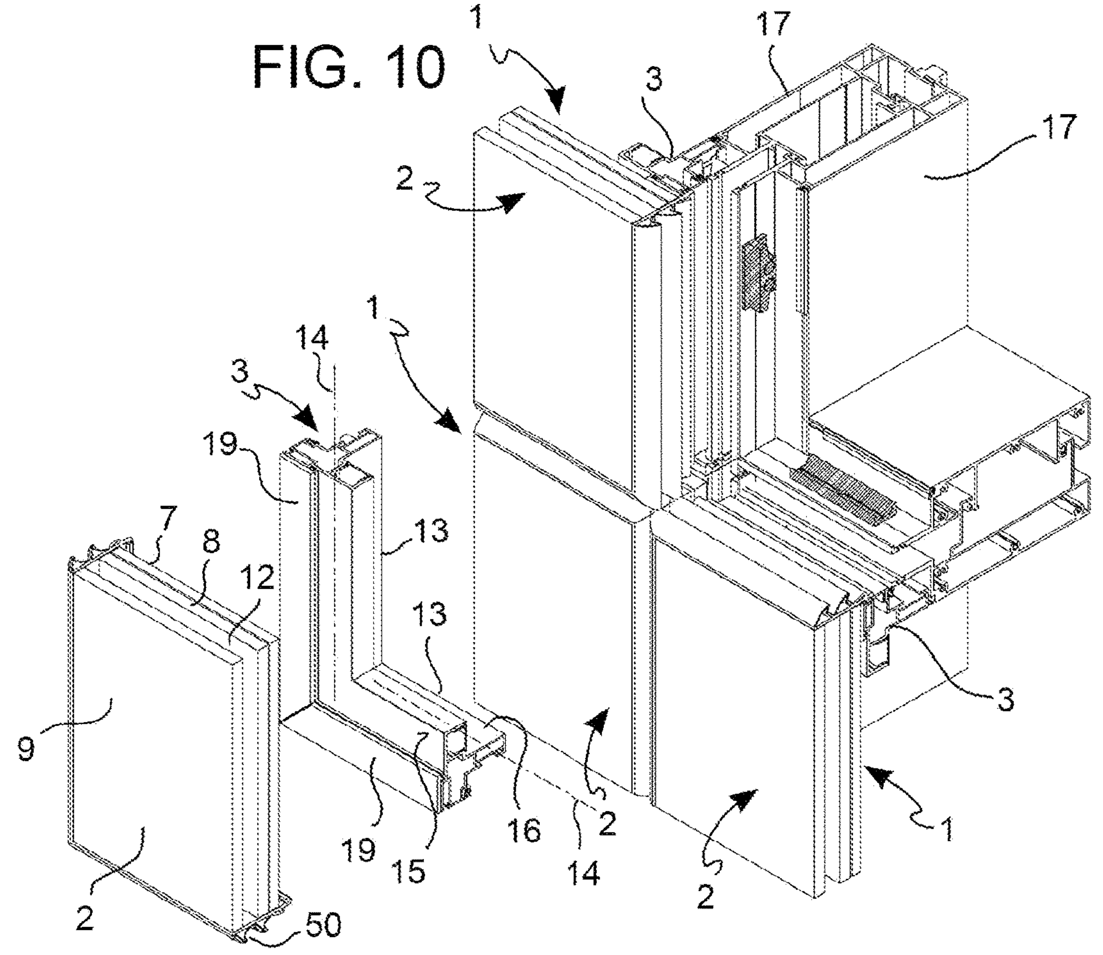
FIG. 10A
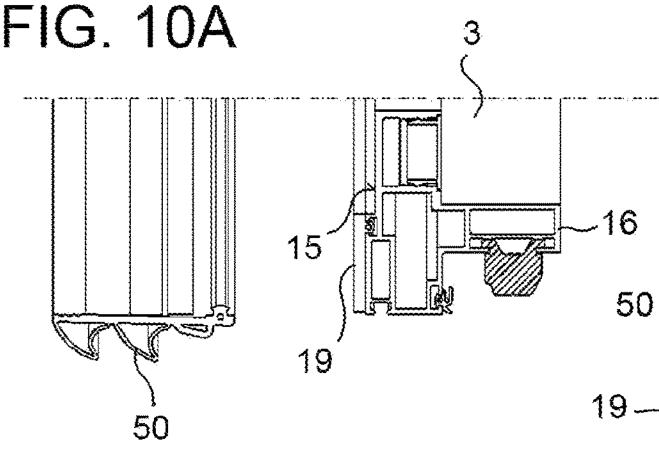
FIG. 11A
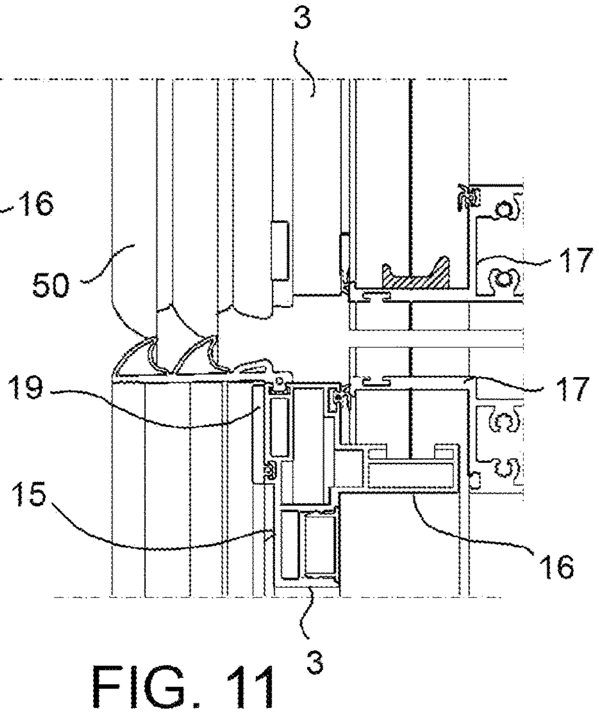
FIG. 11

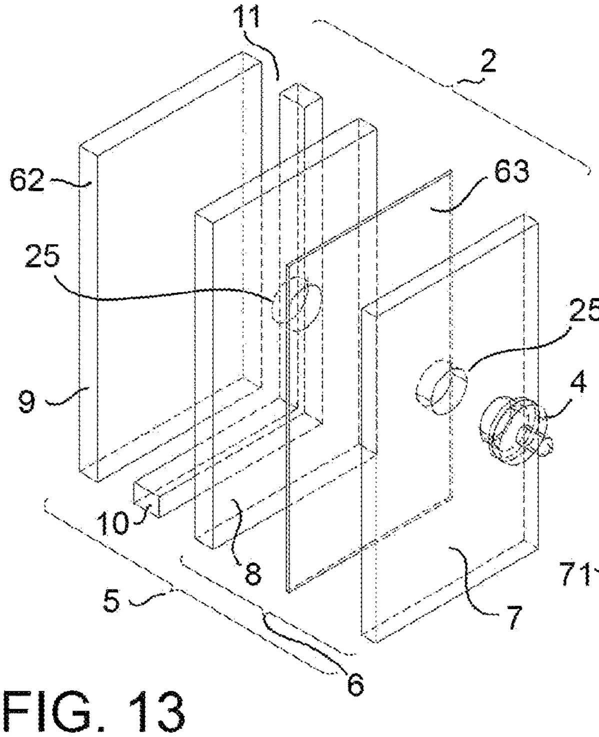
FIG. 13
FIG. 14
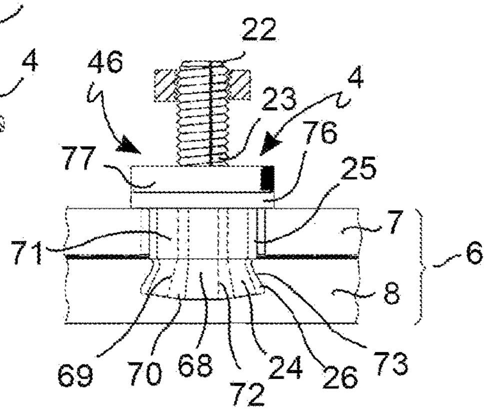
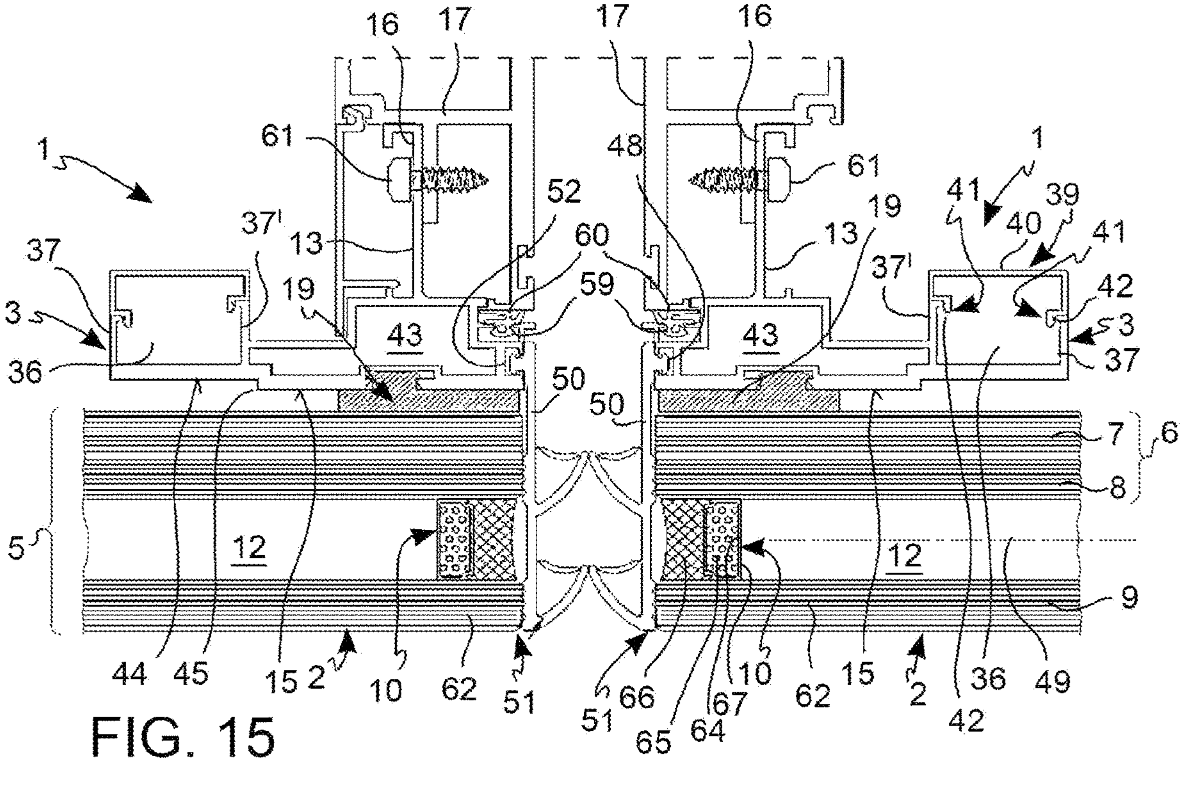
FIG. 15

STRUCTURAL, GLASS-ALUMINUM FACADE COMPONENT

This application claims priority to and benefit of Italian Patent Application No. 102021000000911, filed on Jan. 20, 2021 to Gargiulo et al., which is fully incorporated by reference herein in its entirety.

The present invention relates to a structural, glass-aluminum façade component and to a structural glass-aluminum façade for buildings.

Aluminum and glass façades, and continuous structural façades in particular, are taking an increasingly significant role in all areas of construction. The continuous glass-aluminum façade is a multifunctional filter between the exterior and interior of the building and plays a key role in the economics of energy performance, comfort, and safety.

Known aluminum and glass façades comprise so-called cell modules consisting of a glass window, a secondary frame (or movable frame), and a primary frame (fixed frame), in which the glass window is glued to the secondary frame and the secondary frame is screwed to the main frame. Cell modules are manufactured and pre-assembled in several steps which are carried out at both the premises of the window manufacturer and the glassworks.

FIG. 23 shows the procedure for providing cell modules of known glass and aluminum façades. The window manufacturer preassembles the secondary profile and sends it to the glassworks. Once the glass window has been made, the glassworks glues it to the secondary profile by means of structural silicone (this is a delicate operation that can only be performed at the glassworks) and sends the glass window and secondary frame assembly to the window manufacturer, who completes the cell module by assembling the secondary frame to the main frame by screwing. The completed cell module is then transported to the construction site for final mounting to the building.

This manufacturing process is undesirably complex, expensive, and time-consuming.

Moreover, cell modules of known glass and aluminum façades are difficult to disassemble in case of repair (replacement of damaged glass windows and/or secondary frames) and in case of façade dismantling and separation of the various materials for recycling them.

A further disadvantage of known glass and aluminum façades is the low structural resistance (for example, against deformations) of the gluing by means of structural silicone as compared to the individual resistance of the glass window and therefore the poor utilization of the load-bearing potential of a composite glass and aluminum structure.

Therefore, it is the object of the present invention to provide an improved glass and aluminum façade component, as well as a method for the manufacturing thereof, having such features as to obviate at least some of the drawbacks of the prior art.

It is a particular object of the invention to reduce the times, costs, and complexity of the steps of manufacturing and assembling the cell modules of the glass and aluminum façade. It is a further particular object of the invention to provide a glass and aluminum façade which is easier to disassemble in case of repair (replacement of damaged glass windows and/or secondary frames) and in case of dismantling and separation of aluminum and glass for recycling them. It is still a further object of the invention to provide components for glass and aluminum façades which are more rigid and better utilize the load-bearing potential of a composite glass and aluminum structure.

These and other objects are achieved by a façade component according to claim 1 and by a manufacturing method according to claim 12. The dependent claims relate to advantageous and preferred embodiments.

According to an aspect of the invention, a façade component comprises a glass window and a secondary frame connected to the glass window by means of a plurality of connectors, in which:

the glass window comprises a multilayer panel with a first (inner) glass layer consisting of at least two glass sheets adjacent and glued to each other, a second (outer) glass layer consisting of at least one glass sheet which is separated and spaced apart from the first layer by a sealing spacer extending along the whole periphery of the multilayer panel, and a gap delimited between the first glass layer and the second glass layer and the sealing spacer, the secondary frame comprises a plurality of secondary elongated profiles having a cross section shape which is substantially constant along a longitudinal extension thereof and forming:

an engagement surface facing the glass window, a connection portion, opposite to the engagement surface, for connecting the secondary frame to a primary frame of the façade, a first gasket seat formed in the engagement surface and accommodating a first gasket extending along the whole secondary profile and interposed in direct contact between the engagement surface and the glass window, an engagement seat forming a plurality of engagement holes leading to the engagement surface and each receiving an engagement portion of one of the connectors, respectively, the connectors each comprise an expansion portion anchored in an expansion hole in the first glass layer, a pin connected to the expansion portion and forming the engagement portion, as well as a releasable tightening member which engages the engagement portion of the connector and the engagement seat of the secondary frame and tightens the glass window against the secondary frame, in which the expansion hole and the expansion portion extend through the first glass sheet bordering with the secondary frame and into the second glass sheet adjacent to the first glass sheet on a side opposite to the secondary frame, in which the expansion hole 25 and the expansion portion 24 have at least one local widening which creates an anti-removal shape coupling between the connector and the first glass layer.

The cell modules of the glass and aluminum façades may be manufactured and assembled in a more convenient manner by virtue of the connection of the secondary frame to the glass window by means of releasable expansion and tightening connectors.

The multilayer glass panels are made at the glassworks and the mechanical expansion connectors are applied to the first glass layer thereof. The prefabricated glass window and expansion connectors assembly is sent from the glassworks to the window manufacturer which fastens it, with a simple tightening operation at the factory, to the new secondary frame, and screws the primary frame to the connection portion of the secondary frame. The cell module thus obtained may be directly sent to the construction site, as shown in FIG. 24.

This eliminates the transport of the secondary frame from the window manufacturer to the glassworks, thus resulting in a decrease in the transport costs and times.

The suggested façade component further allows the simultaneous production of the aluminum elements and the glass elements and therefore a decrease in the times for creating the cell module, as well as the possibility of ordering the glass windows before manufacturing the aluminum frame.

The suggested façade component completely eliminates the need to use structural silicone to fasten the glass to the secondary frame, with subsequent decrease in the processing times, dismantling costs, use of expensive machinery, and operator training and safety.

Glass and aluminum façades obtained using the suggested façade component are easier to disassemble in case of repair (replacement of damaged glass windows and/or secondary frames) and in case of dismantling and separation of aluminum and glass for recycling them.

The suggested façade component further better takes advantage of the load-bearing potential of a composite glass and aluminum structure because the expansion connectors (the number and size of which may be freely selected as needed) serve as cutting pins and are more rigid and resistant than the gluing using structural silicone of the prior art.

In order to better understand the invention and appreciate the advantages thereof, a description of non-limiting exemplary embodiments will be provided below with reference to the drawings, in which:

FIG. 10 is a perspective view of a detail of a façade made with façade components according to an embodiment of the invention;

FIG. 10A is an exploded view of a detail of the façade component in FIG. 10;

FIG. 11 is a sectional view of a detail in FIG. 10;

FIG. 11A is a sectional view of a detail in FIG. 10A;

FIG. 13 is an exploded view of a multilayer glass window of a façade component according to an embodiment;

FIG. 14 is a side view of a detail of the glass window in FIG. 13, and of an expansion connector applied thereto;

FIG. 15 is a sectional view of a detail of a façade with façade components, glass windows, secondary frames and primary frames, according to an embodiment;

FAÇADE COMPONENT 1

Figure 1:
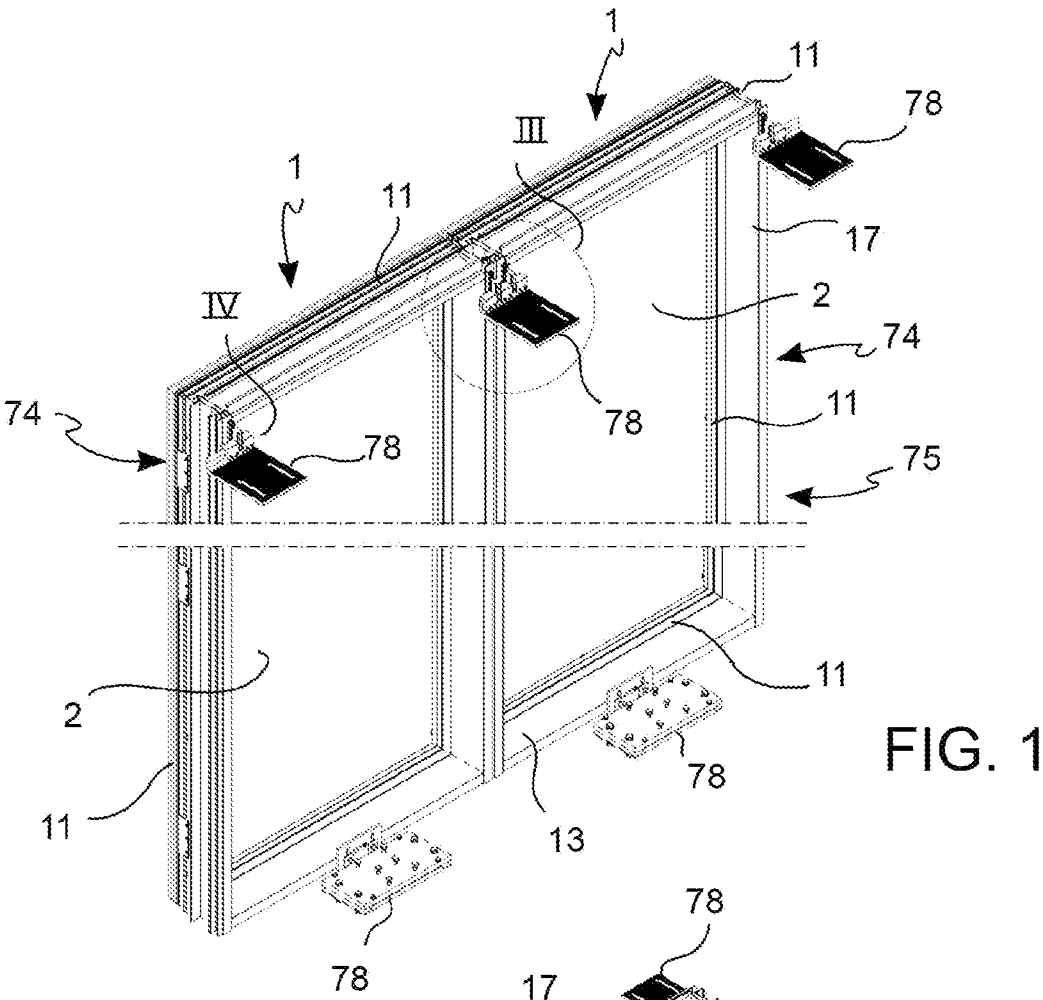
FIG. 1 is a perspective rear view of two cell modules of a glass and aluminum façade according to an embodiment.
Figure 2:
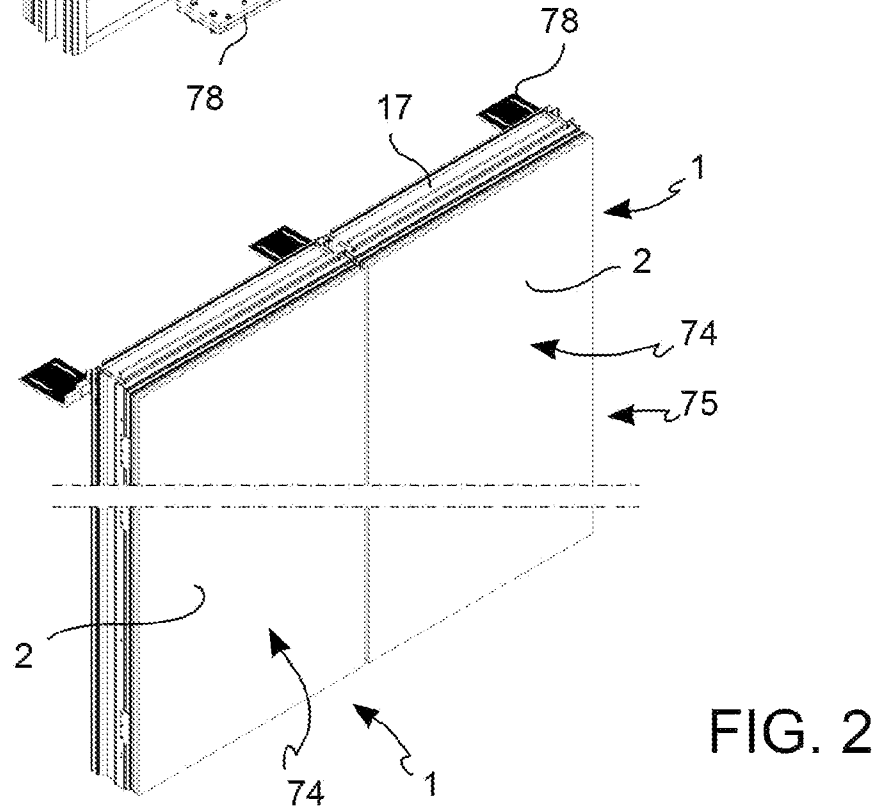
FIG. 2 is a perspective front view of the two cell modules in FIG. 1.
Figure 3:
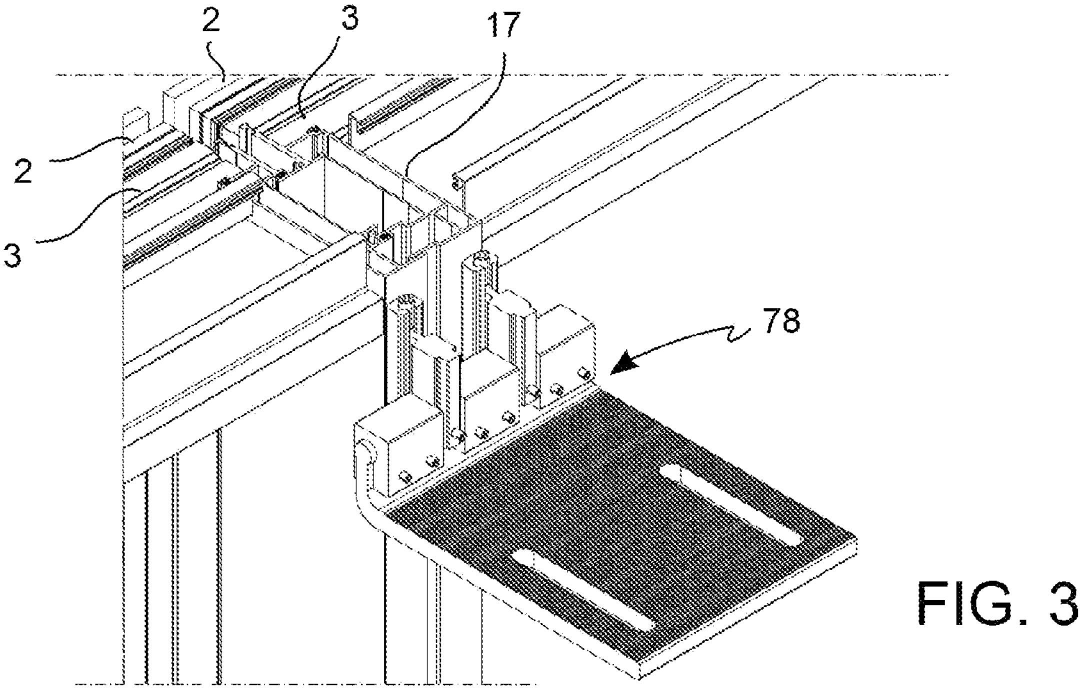
FIG. 3 is an enlargement of detail III in FIG. 1.
Figure 4:
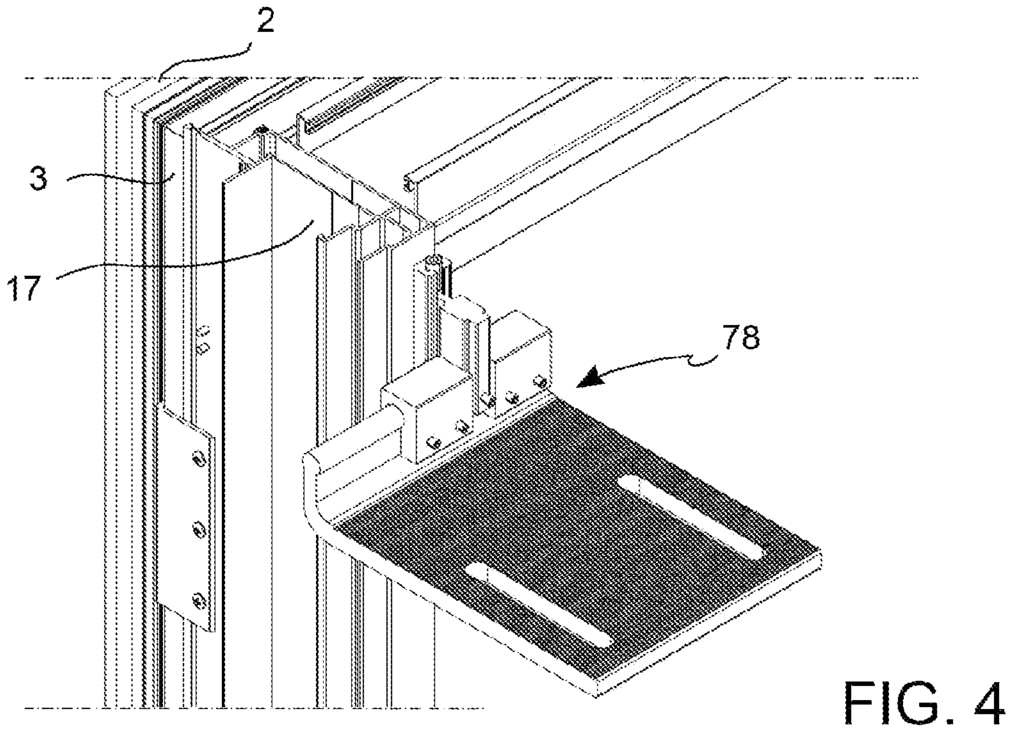
FIG. 4 is an enlargement of detail IV in FIG. 1.
Figure 5:
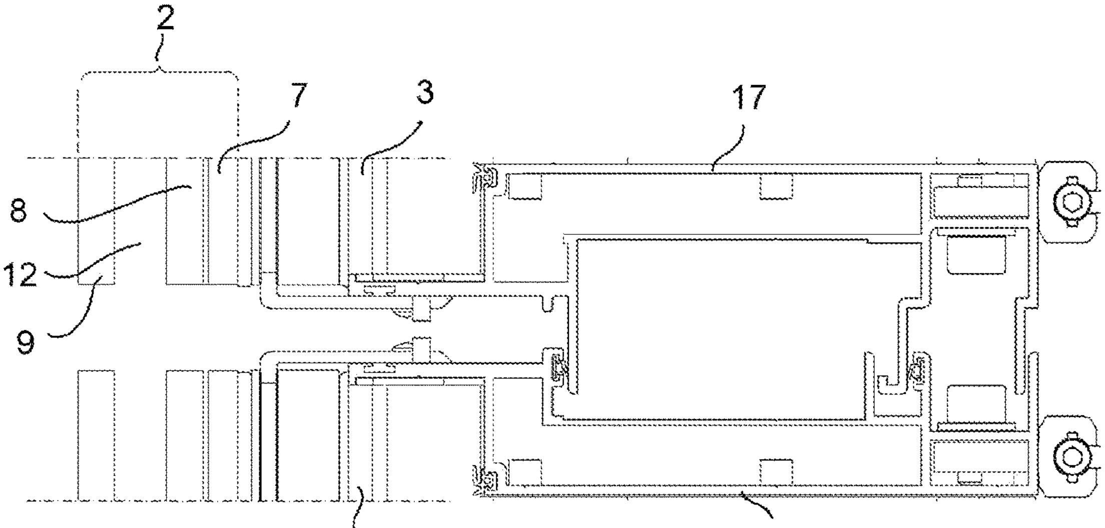
FIG. 5 is a top view of detail III in FIG. 1.

A façade component 1 comprises a glass window 2 and a secondary frame 3 connected to the glass window 2 by means of a plurality of connectors 4, in which:

- the glass window 2 comprises a multilayer panel 5 with a first (inner) glass layer 6 consisting of at least a first glass sheet 7 and a second glass sheet 8 adjacent and glued to each other, over the whole surface, a second (outer) glass layer 9 consisting of at least one glass sheet which is separated and spaced apart from the first glass layer 6 by a sealing spacer 10 extending along the whole periphery 11 of the multilayer panel 5, and a gap 12 delimited between the first glass layer 6 and the second glass layer 9 and the sealing spacer 10,
- the secondary frame 3 comprises a plurality of elongated secondary extruded aluminum profiles 13 having a cross section shape which is substantially constant along a longitudinal extension thereof and forming:
- an engagement surface 15 facing the glass window 2,
- a connection portion 16, opposite to the engagement surface 15, for connecting the secondary frame 3 to a primary frame 17 of the façade,
- a first gasket seat 18 formed in the engagement surface 15 and accommodating a first gasket 19 extending along the whole secondary profile 13 and interposed in direct contact between the engagement surface 15 and the glass window 2,
- an engagement seat 20 forming a plurality of engagement holes 21 leading into the engagement surface 15 and each receiving an engagement portion 22 of one of the connectors 4, respectively,
- the connectors 4 each comprise an expansion portion 24 anchored in an expansion hole 25 in the first glass layer 6, a pin 23 connected to the expansion portion 24 and forming the engagement portion 22, as well as a releasable tightening member 27 which engages the engagement portion 22 of connector 4 and the engagement seat 20 of the secondary frame 3 and tightens the glass window 2 against the secondary frame 3,
- in which the expansion hole 25 and the expansion portion 24 extend through the first glass sheet 7 bordering with the secondary frame 3 and into the second glass sheet 8 adjacent to the first glass sheet 7 on a side opposite to the secondary frame 3,
- in which the expansion hole 25 and the expansion portion 24 have at least one local widening 26 so as to create an anti-extraction shape coupling between connector 4 and the first glass layer 6.

Secondary Frame 3

According to an embodiment, the secondary profiles 13 of the secondary frame 3 are substantially rectilinear metal, preferably aluminum, preferably extruded, profiles connected to each other at the ends thereof to form a rectangular frame (FIGS. 1, 10, 10A) preferably extending at least also along the periphery, which is also rectangular, of the multilayer panel 5 of the glass window 2.

Figure 6:
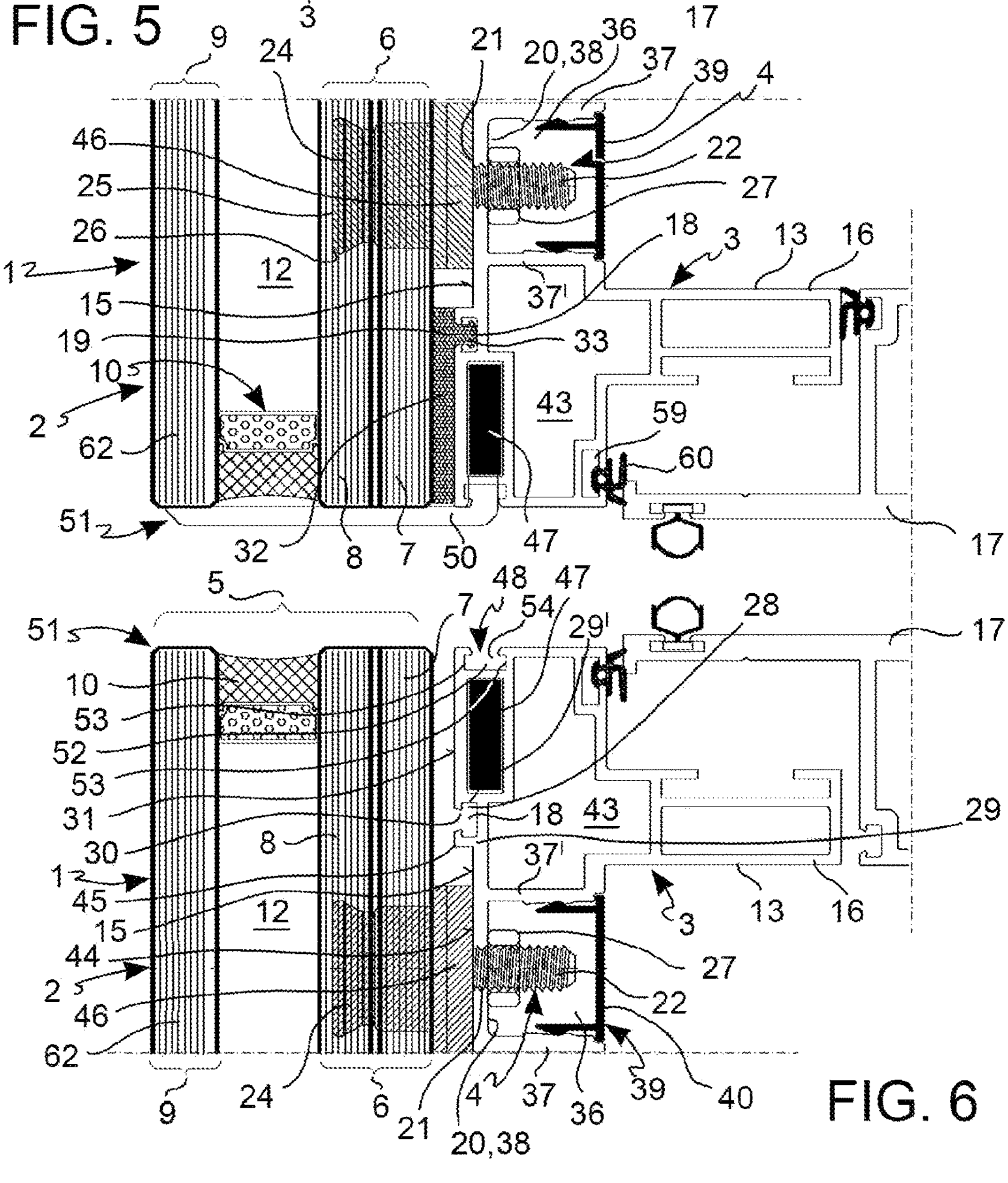
FIG. 6 is a sectional view of a detail of façade components of the two cell modules in FIG. 1.
Figure 7:
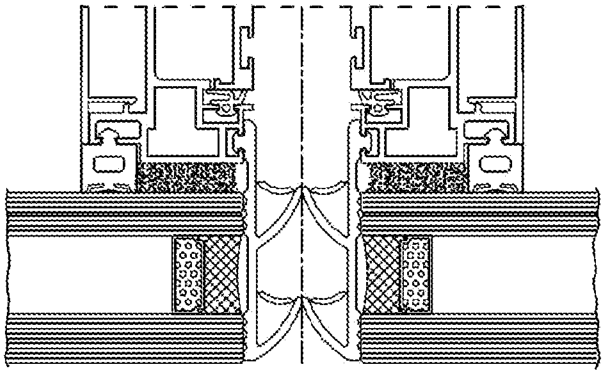
FIG. 7 is a sectional view of a detail of a glass and aluminum façade with gluing by means of structural silicone and with no expansion connectors, according to an embodiment known to the inventors.
Figure 8:
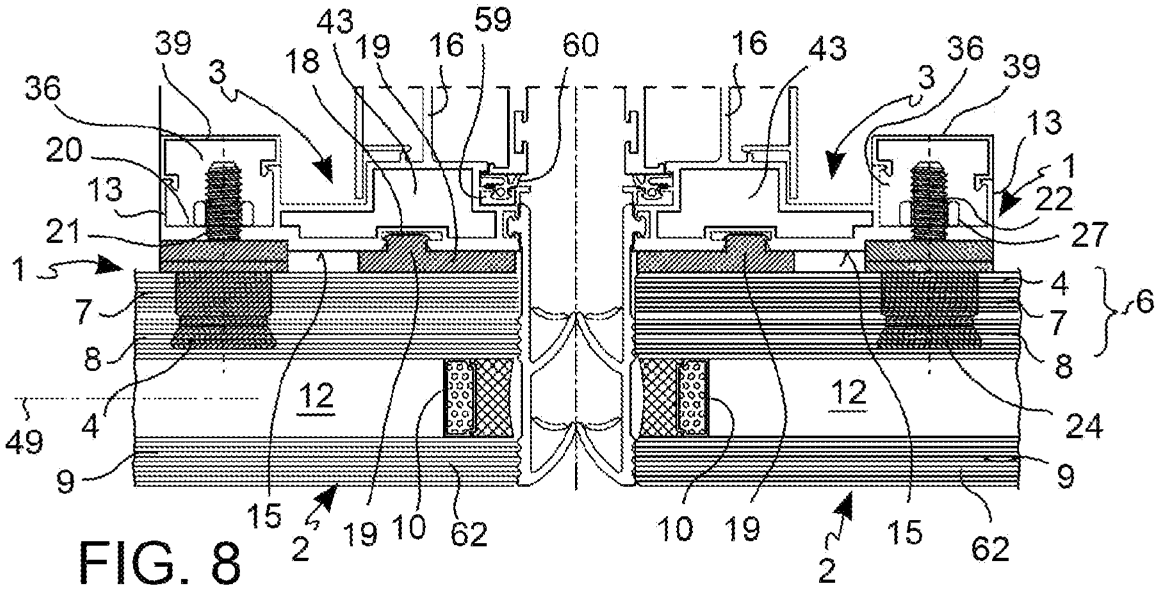
FIG. 8 is a sectional view of a border area between two cell modules of a glass and aluminum façade according to an embodiment.
Figure 9:
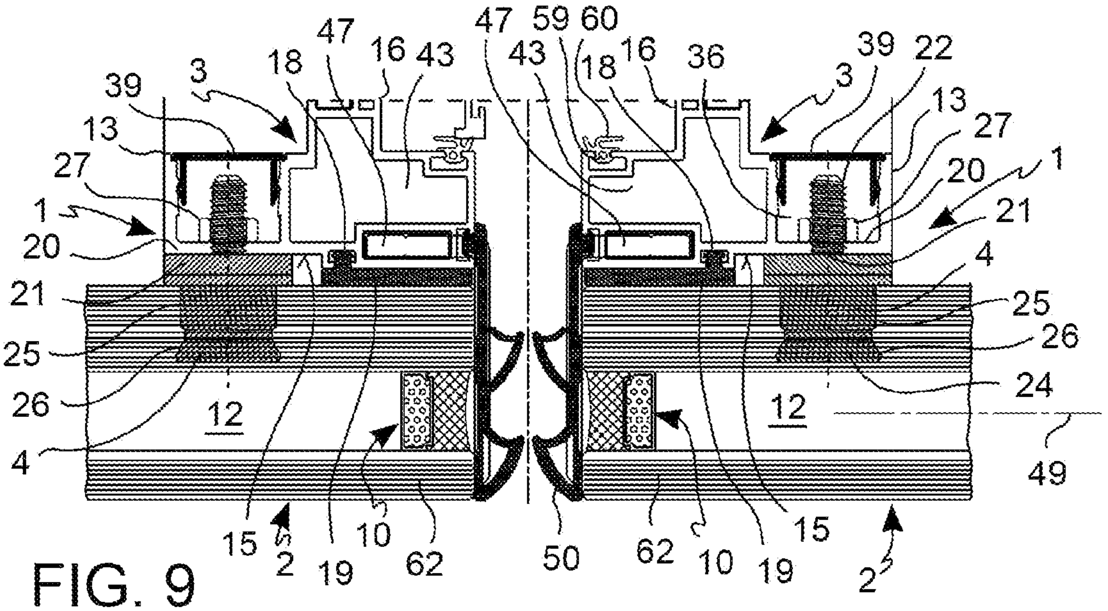
FIG. 9 is a sectional view of a border area between two cell modules of a glass and aluminum façade according to a further embodiment.
Figure 12:
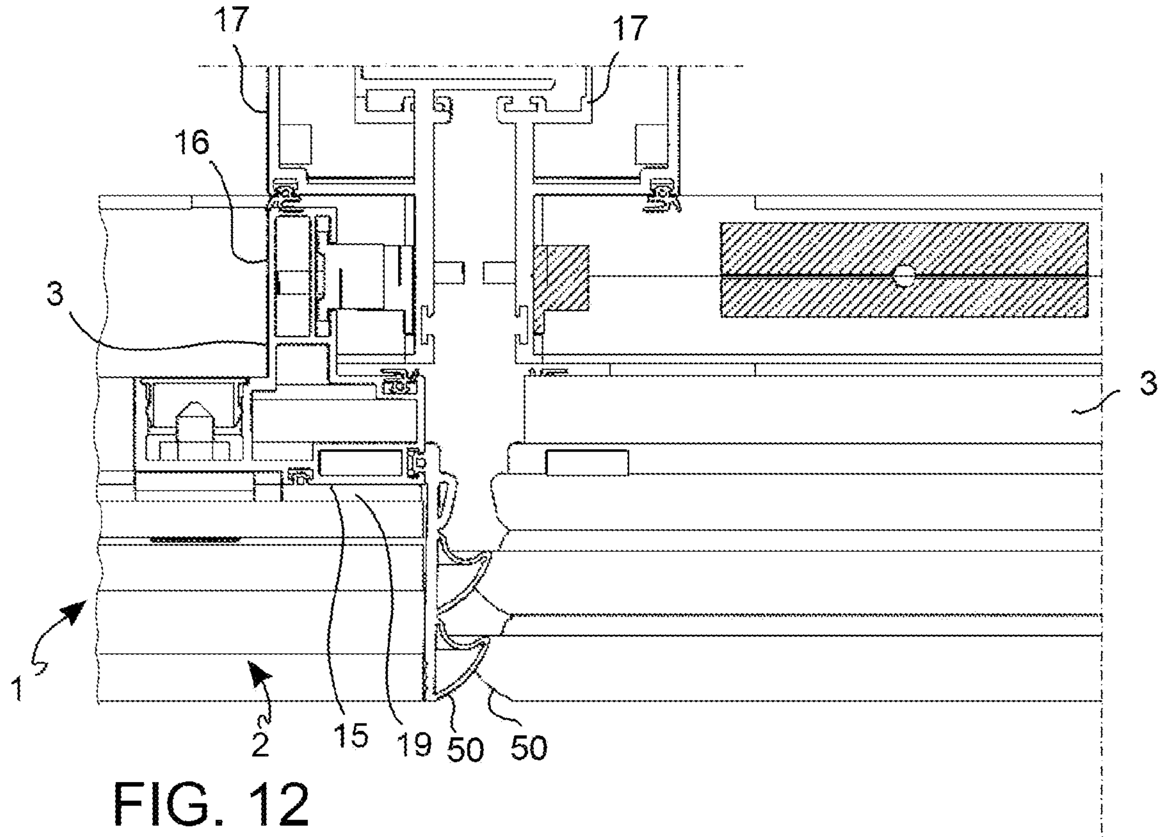
FIG. 12 is a sectional view of a further detail in FIG. 10.
Figure 12A:
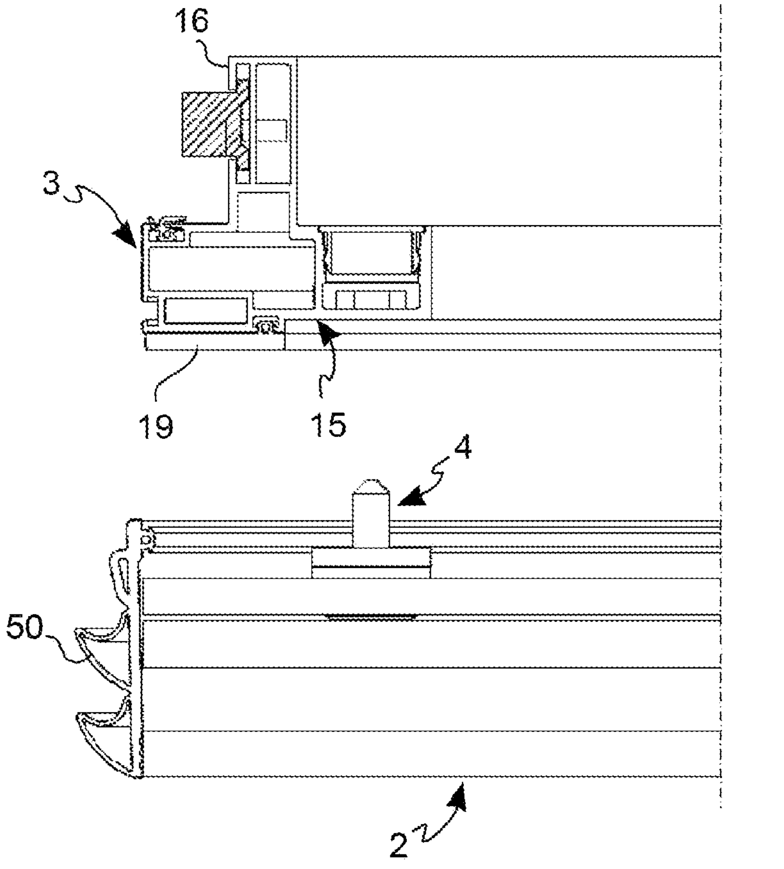
FIG. 12A is a sectional view of a further detail in FIG. 10A.
Figure 16:
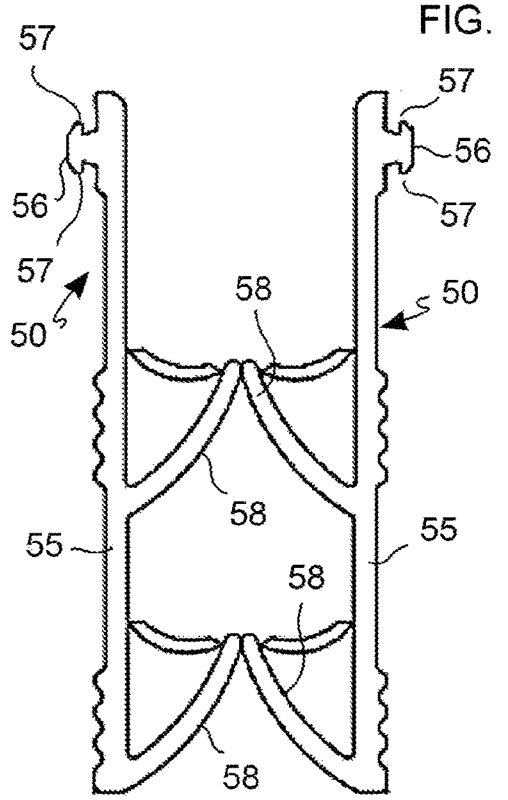
FIGS. 16, 17, 18, 19 are sectional views of gaskets of the glass and aluminum façade according to an embodiment.
Figure 17:
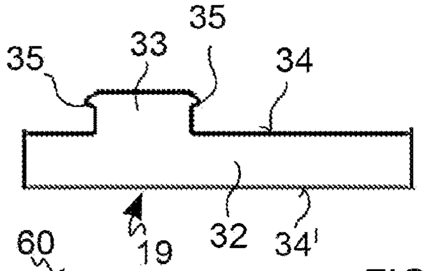
Figure 18:
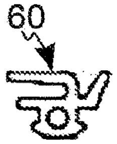
Figure 19:
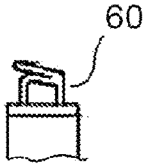
Figure 20:
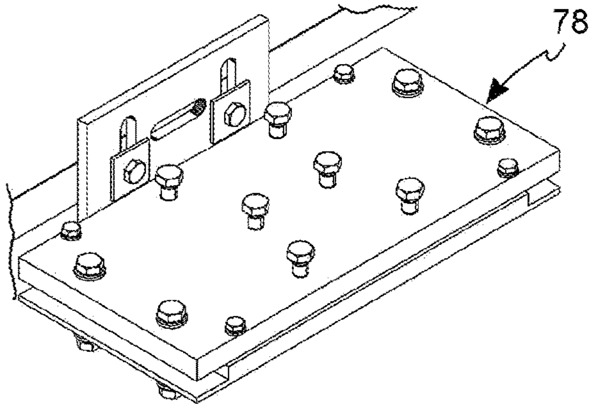
FIG. 20 is an enlarged view of detail XX in FIG. 1.
Figure 21:
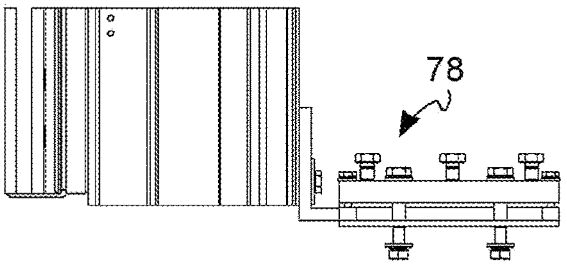
FIG. 21 is a side view of the detail in FIG. 20.
Figure 22:
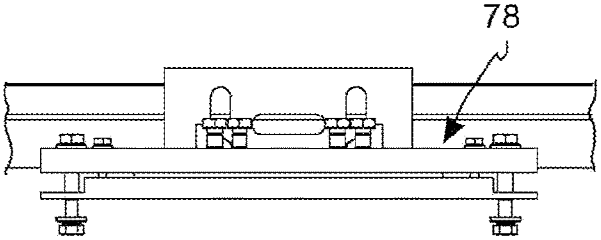
FIG. 22 is a rear view of the detail in FIG. 20.
Figure 23:
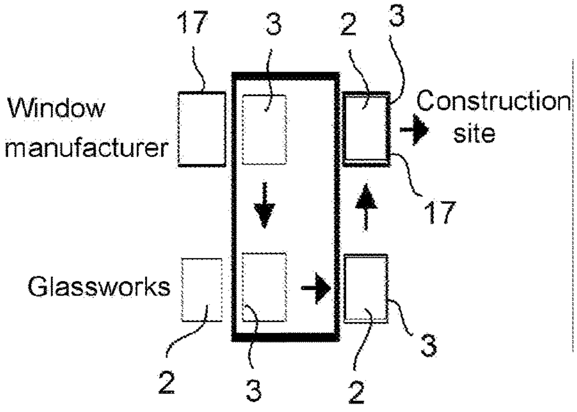
FIG. 23 is a diagrammatic illustration of a manufacturing and pre-assembly process of a cell module of a glass and aluminum façade of the prior art.
Figure 24:
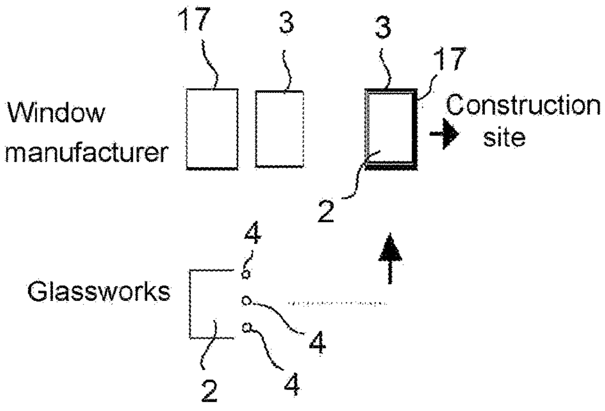
FIG. 24 is a diagrammatic illustration of a manufacturing and pre-assembly process of a cell module of a glass and aluminum façade according to the invention.

According to an embodiment (FIGS. 6, 8, 9), the first gasket seat 18 forms a first fastening channel 28 open towards the glass window 2 and delimited by two side walls 29, 29' forming two opposite undercuts 30, as well as a planar sealing surface 31 extending laterally along the first fastening channel 28.

The first gasket 19 has an elongated shape with constant cross section along a longitudinal extension thereof and forms a plate-like sealing portion 32 with a profile sealing surface 34 and a glass window sealing surface 34', which are preferably planar, opposite, and parallel to each other, and with a fastening portion 33 protruding from the profile sealing surface 34 and having a mushroom-shaped section with two opposite fastening teeth (or edges) 35. The fastening portion 33 is inserted into the first fastening channel 28 with anti-removal engagement of the fastening teeth 35 in the undercuts 30 and the profile sealing surface 34 adheres in contact against the sealing surface 31 and the glass window sealing surface 34' adheres in contact against the glass window 2.

The first gasket 19 is applicable/removable to/from the first gasket seat 18 in a snapping manner or through longitudinal insertion/removal.

This simplifies the interposition of the first gasket 19 between the glass window 2 and the secondary frame 3, ensures the airtight sealing between the three components and facilitates the disassembly thereof and the selective replacement or selective repair thereof.

According to an embodiment, the engagement surface 15 forms a tightening surface 44 at the engagement holes 21 adapted to be engaged by a tightening flange 46 or tightening washer (for example, a nut or a single-layer or multilayer annular disc) located about the pin 23 of connector 4 and tightened between the glass window 2 and the engagement surface 15, in which said tightening surface 44 is parallel to the planar sealing surface 30 but offset with respect thereto, for example by means of a step 45, to compensate for a difference in thickness between the first gasket 19 and the tightening flange 46 or tightening washer.

The tightening flange 46 may, for example be a single-layer or multilayer annular body made of plastic material and/or metal, for example steel, for example with a first layer made of polyamide adjacent to the glass and a second metal layer made of (for example, a steel nut) on the opposite side of the glass, which is particularly adapted to a compression tightening which mechanically is more resistant than the elastomeric material of the first gasket 19 and less fragile or susceptible to scratches than the glass surface of the glass window 2.

This allows optimizing the first gasket 19 for the sole sealing function, the glass for the sole barrier function between the external and internal environment, and the tightening flange 46 as pure tightening interface, without the sealing function.

According to an embodiment, the engagement seat 20 forms an engagement channel 36 open towards a side opposite to the engagement surface 15 and delimited by two side walls 37, 37' and a bottom wall 38 in which the engagement holes 21 are formed. This allows an easy access to the engagement portions 22 of the connectors 4 when the connectors 4 are inserted, tightened, and possibly released and disengaged.

The engagement channel 36 is closeable and openable by a cap or closing plate 39 to protect the connectors 4 from tampering, pollutants and to improve the appearance of the façade component 1.

Advantageously, an outer wall 37 of the side walls 37, 37' of the engagement channel 36 forms an outer wall of the secondary profile 13 so that the engagement channel 36, closed by the closing plate 39, creates a closed heat-insulating cell bordering with an internal room of the building.

The closing plate 39 may be made of plastic material or aluminum and may comprise a closing wall 40 from which two stop walls or tabs 41 protrude, engaging corresponding stop profiles 42 formed by the side walls 37, 37'. The closing plate 39 is applicable/removable to/from the engagement channel 36 in an elastically snapping manner or through longitudinal insertion/removal.

The secondary profile 13 further delimits at least a first closed lightening and heat-insulating cavity 43 (with the exception of the ends of the secondary profile 13, which however are advantageously connected to each other so as not to expose the cross section of the secondary profile 13 to the outside).

Advantageously, an inner wall 37' of the side walls 37, 37' of the engagement channel 36 directly borders on the first closed cavity 43 so as to create a multi-cell structure which increases the heat-insulating capacity of the secondary frame 3.

The secondary profile 13 forms a second closed cavity 47 (with the exception of the ends of the secondary profile 13, which however are advantageously connected to each other so as not to expose the cross section of the secondary profile 13 to the outside) interposed between the first closed cavity 43 and a wall forming the sealing surface 31. The second closed cavity 47 serves the function of seat for a square for hammering and/or joining by means of a plug between two abutting secondary profiles 13 connected to each other.

The secondary profile 13 forms a second gasket seat 48 spaced apart from the first gasket seat 18 towards a side opposite to the engagement seat 20 and preferably facing a direction parallel to surface 49 of the glass window 2.

The second gasket seat 48 accommodates a second gasket 50 or sealing structure for covering or closing or sealing a peripheral area 51 (extending along periphery 11) of the façade component 1 or of façade 52 at such peripheral areas 51 (FIGS. 8, 9, 10, 11, 12, 15).

According to an embodiment (FIGS. 8, 9, 10, 11, 12, 15), the second gasket seat 48 forms a second fastening channel 52 open in direction parallel to the glass window surface 49 and delimited by two side walls 53, 53' forming two opposite undercuts 54.

The second gasket 50 has an elongated shape with constant cross section along a longitudinal extension thereof and forms:

- a substantially planar covering portion 55 which covers the peripheral area 51 of the glass window 2 from the outside,
- a fastening portion 56 transversely protruding from the covering portion 55 and having a mushroom-shaped section with two opposite fastening teeth (or edges) 57. The fastening portion 56 is inserted in the second fastening channel 52 with anti-removal engagement of the fastening teeth 57 in the undercuts 54.

For the covering or closing or sealing of façade areas where two façade components 1 oriented on a same plane meet, the second gasket 50 may further form a plurality of sealing lips 58 transversely protruding from the covering portion 55, away from the glass window 2 thereof and towards the glass window 2 of the adjacent façade component 1 (FIGS. 8, 9, 10, 11).

The second gasket 50 is applicable/removable to/from the second gasket seat 48 in a snapping manner or through longitudinal insertion/removal.

The secondary profile 13 further forms one or more third gasket seats 59 spaced apart from the first gasket seat 18 and from the second gasket seat 48 and facing in a direction which is opposite or transverse to the first gasket seat 18.

Each third gasket seat 59 accommodates a third gasket 60 for sealing the secondary frame 3 with respect to the primary frame 17 (FIGS. 5, 6, 8, 9, 12, 15).

The third gasket 60 is applicable/removable to/from the third gasket seat 59 in a snapping manner or through longitudinal insertion/removal.

The connection portion 16 may comprise a plate or a box-like structure protruding towards a side opposite to the engagement surface 15 and forming a plurality of holes for connecting the secondary frame 3 to the primary frame 17 by means of screws 61 (FIG. 15).

Glass Window 2

According to an embodiment, the glass window 2 is planar and preferably rectangular or polygonal with rectilinear peripheral edges in order to facilitate a modular construction of the façade.

The first glass layer 6 is tempered to allow the installation of connectors 4. The first glass sheet 7 and the second glass sheet 8 are glued to each other over the whole interface area by lamination with an interposed polymer layer 63, preferably made of PVB (polyvinyl butyral), preferably having a thickness equal to or greater than 1.52 mm. The lamination provides the first glass layer 6 with shatter-resistant safety features. Indeed, in case of impact, the interposed polymer layer 63 holds the glass fragments and ensures a residual mechanical resistance of the damaged first glass layer 6.

The polyvinyl butyral (PVB), placed between the first glass sheet 7 and the second glass sheet 8, which are pressed in an autoclave at a temperature of 250° C., has a resistance in the order of 20 MPa and an elongation at break of about 40%, does not damage the transparency of the first glass layer 6 and improves the heat-insulating and soundproofing properties thereof.

The second glass layer 9 comprises a third glass sheet 62 made of float glass, intended to be exposed to the external environment of the building.

Gap 12 may be filled with inert gas, for example argon or krypton, to increase the energy and isolation performance of the glass window 2. The thickness of gap 12 preferably is greater than the thickness of the first glass layer 6 or of the second glass layer 9.

The sealing spacer 10 may comprise:

- a dehydrating molecular sieve 64,
- a primary sealant 65 (preferably a butyl sealant) serving the function of anti-water vapor barrier and temporary adhesive (during the assembly step),
- a secondary sealant 66 (preferably polysulphide, polyurethane or silicone) serving the function of permanent adhesive and permanent transmitter of mechanical stresses, to protect the primary sealant 65 from mechanical stresses and excessive deformations, thus ensuring the main function of anti-water vapor barrier thereof, and
- optionally, a reinforcement spacer profile 67, for example made of aluminum,
- all continuously extending along the whole periphery 11 of the glass window 2.

Glass Connectors 4

According to an embodiment, the expansion portion 24 comprises a hollow metal body 69 with a portion 70 which is conical shape or stepped-conical in shape, and possibly a tubular portion 71, and a plurality of longitudinal grooves 72 which allow a radial expansion of the hollow metal body 69. The expansion portion further comprises one or more polymer sheaths 73 which encompass the hollow metal body 69 to avoid tension peaks in the expansion hole 25.

Pin 23 is inserted or screwed into the expansion portion 24 and forms an expansion end which may be positioned in or screwed into the hollow metal body 69 for a radial expansion thereof through axial displacement of pin 23 with respect to the hollow metal body 69.

The engagement portion of pin 23 preferably forms a thread and the releasable tightening member 27 preferably comprises a nut screwed onto the thread of the engagement portion 22.

The expansion hole 25 forms a through hole through the first glass sheet 7 and the polymer layer 63, but only a blind hole (not a through hole) in the second glass sheet 8, in which the blind hole in the second glass sheet 8 forms the aforesaid local widening 26 in the form of a conical groove at which the conical portion 70 of the hollow metal body 69 is located.

The connectors 4 further comprise the tightening flange 46 or tightening washer located about pin 23 and consisting of an annular polymer disc 76 (glass side) preferably formed in one piece with the polymer sheath 73, and a steel disc or nut 77 (FIG. 14).

The connectors 4 further comprise an injection channel, preferably formed in the tightening flange 46 and/or in the polymer sheath 73, for injecting polymer resin into the expansion portion 24.

Cell Module 74 and Façade 75

The primary frame 17 consists of elongated metal profiles, preferably extruded aluminum profiles, preferably connected together at the ends thereof to form a planar rectangular or polygonal frame having a shape which is compatible with the shape of the secondary frame 3. The primary frame 17 is connected, preferably screwed, to the secondary frame 3, and the one or more third gaskets 60 may be interposed therebetween.

The assembly of the glass window 2, secondary frame 3 and primary frame 17 forms a pre-assembled cell module 74 for obtaining a façade 75 (FIGS. 1, 2, 10, 10A).

The cell modules 74 are fastened to the building by means of adjustable fastening brackets 78 connected to the secondary frame 17 (FIGS. 1, 3, 4, 20, 21, 22).

Manufacturing Method

According to an embodiment, the façade component 1, the cell module 74 and façade 75 are made by a manufacturing method comprising the steps of:

A) mechanically processing the glass sheets of the first glass layer 6 and the second glass layer 9 (in particular, cutting and finishing by grinding the corners and surfaces of the sheets to increase the resistance against breakage and the transparency and shine of the surfaces), including making expansion holes 25 in the first 7 and second 8 glass sheets for the first glass layer 6 (the holes of the two glass sheets 7, 8 are to be perfectly aligned, tapered and trimmed with the preferably conical local widening 26);

B) thermally treating, including thermal tempering, the single glass sheets of the first glass layer 6 and the second glass layer 9 following the mechanical processing step A) (the thermal tempering gives the glass sheets increased mechanical and thermal resistance);

C) laminating the first glass layer 6 by gluing the first 7 and second 8 glass sheets by means of the adhesive polymer layer 63 interposed therebetween, preferably by means of the steps of:

C1) stratifying the first glass layer 6 by interposing a polymer sheet with adhesive properties in direct contact between the first glass sheet 7 and the second glass sheet 8 (the polymer sheets, for example made of polyvinyl butyral, PVB, are stored in a climate chamber at a controlled temperature and relative humidity, preferably at a temperature between 18° C. and 22° C., advantageously 20° C., and a relative humidity of the air between 25% and 31%, advantageously 28%). The stratifying step C1) may be advantageously preceded by a step of cleaning the glass sheets with demineralized water, and then drying;

C2) heating the first stratified, but not yet glued, glass layer 6 to de-aerate the interface area between the first glass sheet 7 and the second glass sheet 8;

C3) activating the adhesive properties of the polymer sheet to form the adhesive polymer layer 63, for example by means of an activation agent, for example containing manganese;

C4) pressure and temperature treating the first stratified glass layer 6 glued in the autoclave, for example by means of a sequence of pressurization (at about 20 MPa), heating (at about 250° C.), maintaining temperature and pressure, cooling, depressurization;

D) assembling the first laminated glass layer 6 and the second glass layer 9 to form the glass window 2 by distancing and connecting the first glass layer 6 and the second glass layer 9 and making the sealing spacer 10 (which also serves the function of connection) between the first glass layer 6 and the second glass layer 9 along the periphery 11 of the glass window 2, in particular by positioning the dehydrating molecular sieve 64, primary sealant 65, secondary sealant 66 and optionally the reinforcement spacer profile 67;

E) once the glass window 2 has been assembled, inserting and expanding the expansion portion 24 of the connectors 4 into the expansion holes 25 of the first glass layer 6 and optionally injecting an additional polymer filler 68 into the expansion portion 24 and/or into the expansion hole 25;

F) connecting the secondary frame 3 to the glass window 2 by connecting the engagement portion 22 of the connectors 4 in the engagement seat 20 of the secondary profiles 13 to form the façade component 1;

G) connecting the primary frame 17 to the secondary frame 3 of the façade component 1, for example by means of connecting screws 61, to form the cell module 74 of the façade;

H) connecting the cell modules 74 to a building to obtain the façade 75.

Obviously, not all the steps of the method are to be carried out necessarily together; some steps may be omitted and sub-groups of steps of the method will be sufficient to obtain pre-assembled, semi-finished or intermediate (for example, the façade component 1, the cell module 74) products in the chain for manufacturing a structural façade made of metal or aluminum and glass.

According to a particularly advantageous aspect of the invention:

steps A), B), C), D) and E) are performed at a glassworks, without any involvement of the secondary frames 2, the glass windows 2 provided with the connectors 4 are sent by the glassworks, for example by truck, to a window manufacturer or metal carpentry workshop far from the glassworks, steps F) and G) are performed by the window manufacturer or metal carpentry workshop without sending the secondary frames 3 from the window manufacturer or metal carpentry workshop to the glassworks, the cell modules 74 are sent by the window manufacturer or metal carpentry workshop, for example by truck, to the construction site.

Therefore, the expensive steps of transporting the secondary frames 3 between the window manufacturer and the glassworks and undesired interruptions in the manufacturing procedures, measures for the coordination and intermediate storage of the semi-assembled products are obviated as compared to the prior art.

The invention claimed is:

1. A façade component, comprising a glass window and a secondary frame connected to the glass window by means of a plurality of connectors, wherein:

the glass window comprises a multilayer panel with a first glass layer formed of at least a first glass sheet and a second glass sheet adjacent and glued to each other, a second glass layer formed of at least one glass sheet which is separated and spaced apart from the first glass layer by a sealing spacer extending along a periphery of the multilayer panel, and a gap delimited by the first glass layer, the second glass layer, and the sealing spacer, the secondary frame comprises a plurality of secondary elongated metal profiles combining to form a secondary profile, the secondary elongated metal profiles having a cross section shape which is substantially constant along a longitudinal extension thereof and forming:

an engagement surface facing the glass window, a connection portion, opposite to the engagement surface, for connecting the secondary frame to a primary frame of façade, a first gasket seat formed in the engagement surface and accommodating a first gasket extending along an entire length of the secondary profile and interposed between the engagement surface and the glass window, an engagement seat forming a plurality of engagement holes opening into the engagement surface and each receiving an engagement portion of one of the connectors, respectively, the connectors each comprise an expansion portion anchored in an expansion hole in the first glass layer, a pin connected to the expansion portion and forming the engagement portion, as well as a releasable tightening member which engages the engagement portion of the connector and the engagement seat of the secondary frame and tightens the glass window against the secondary frame, wherein the expansion hole and the expansion portion extend through the first glass sheet bordering with the secondary frame and into the second glass sheet adjacent to the first glass sheet on a side opposite to the secondary frame, wherein the expansion hole and the expansion portion have at least one local widening which creates an anti-extraction shape coupling between the connector and the first glass layer, wherein the engagement seat forms an engagement channel open towards a side opposite to the engagement surface and delimited by two side walls and a bottom wall in which the engagement holes are formed, and wherein the secondary profile further delimits at least a first closed lightening and heat-insulating cavity, and an inner wall of the side walls of the engagement channel directly borders on the first closed cavity and forms a multi-cell structure.

2. A façade component according to claim 1, wherein the secondary profiles are rectilinear extruded aluminum profiles connected to one another at the ends thereof to form a planar polygonal frame extending along the polygonal periphery of the glass window.

3. A façade component according to claim 1, wherein the first gasket seat forms a first fastening channel open towards the glass window and delimited by two side walls forming two opposite undercuts, as well as a planar sealing surface extending laterally along the first fastening channel, and the first gasket has an elongated shape with constant cross section along a longitudinal extension thereof and forms a plate-like sealing portion with a profile sealing surface and a glass window sealing surface, which are planar, opposite, and parallel to each other, and with a fastening portion protruding from the profile sealing surface and having a mushroom-shaped section with two opposite fastening teeth, and the fastening portion is inserted into the first fastening channel with anti-extraction engagement of the fastening teeth in the undercuts and the profile sealing surface adheres in contact against the sealing surface and the glass window sealing surface adheres in contact against the glass window.

4. A façade component according to claim 1, wherein:

the engagement surface forms a tightening surface at the engagement holes, engaged by a tightening flange located around the connector and tightened between the glass window and the engagement surface, said tightening surface is parallel to the planar sealing surface but offset with respect thereto to compensate for a difference in thickness between the first gasket and the tightening flange.

5. A façade component according to claim 4, wherein the tightening flange comprises a polymer disc having a greater rigidity than the rigidity of an elastomeric material of the first gasket and a lower hardness than the first glass sheet.

6. A façade component according to claim 1, wherein the engagement channel is closable and openable by a closing plate, and an outer wall of the side walls of the engagement channel forms an outer wall of the secondary profile so that the engagement channel, closed by the closing plate, forms a closed heat-insulating cell.

7. A façade component according to claim 1, wherein the expansion portion comprises:

a hollow metal body with a conical shape portion and a plurality of longitudinal grooves, at least one polymer sheath which envelops the hollow metal body, wherein the pin is screwed into the expansion portion for an expansion of the hollow metal body, wherein the engagement portion of the pin forms a thread, and the releasable tightening member comprises a nut screwed onto the thread of the engagement portion, wherein the connectors comprise a tightening flange located about the pin and comprising a polymer disc in contact with the first glass sheet, as well as an injection channel for injecting polymer resin into the expansion portion.

8. A façade component according to claim 1, wherein the expansion hole forms a through hole through the first glass sheet and a blind hole in the second glass sheet, wherein said blind hole forms the local widening in the form of a conical groove at which a conical portion of the expansion portion of the connector is located.

9. A façade component according to claim 1, wherein:

the glass window is planar and polygonal with rectilinear peripheral edges, the first glass layer is tempered, the first glass sheet and the second glass sheet are glued to each other over the whole interface area by lamination with an interposed adhesive polymer layer, the second glass layer comprises a third glass sheet made of float glass, intended to be exposed to an external environment of a building, the thickness of the gap is greater than the thickness of the first glass layer and the thickness of the second glass layer.

10. A façade component, comprising a glass window and a secondary frame connected to the glass window by means of a plurality of connectors, wherein:

the glass window comprises a multilayer panel with a first glass layer formed of at least a first glass sheet and a second glass sheet adjacent and glued to each other, a second glass layer formed of at least one glass sheet which is separated and spaced apart from the first glass layer by a sealing spacer extending along a periphery of the multilayer panel, and a gap delimited by the first glass layer, the second glass layer, and the sealing spacer, the secondary frame comprises a plurality of secondary elongated metal profiles combining to form a secondary profile, the secondary elongated metal profiles having a cross section shape which is substantially constant along a longitudinal extension thereof and forming:

an engagement surface facing the glass window, a connection portion, opposite to the engagement surface, for connecting the secondary frame to a primary frame of façade, a first gasket seat formed in the engagement surface and accommodating a first gasket extending along an entire length of the secondary profile and interposed between the engagement surface and the glass window, an engagement seat forming a plurality of engagement holes opening into the engagement surface and each receiving an engagement portion of one of the connectors, respectively, the connectors each comprise an expansion portion anchored in an expansion hole in the first glass layer, a pin connected to the expansion portion and forming the engagement portion, as well as a releasable tightening member which engages the engagement portion of the connector and the engagement seat of the secondary frame and tightens the glass window against the secondary frame, wherein the expansion hole and the expansion portion extend through the first glass sheet bordering with the secondary frame and into the second glass sheet adjacent to the first glass sheet on a side opposite to the secondary frame, wherein the expansion hole and the expansion portion have at least one local widening which creates an anti-extraction shape coupling between the connector and the first glass layer, wherein:

the engagement surface forms a tightening surface at the engagement holes, engaged by a tightening flange located around the connector and tightened between the glass window and the engagement surface, and said tightening surface is parallel to the planar sealing surface but offset with respect thereto to compensate for a difference in thickness between the first gasket and the tightening flange.

11. A façade component according to claim 10, wherein the tightening flange comprises a polymer disc having a greater rigidity than the rigidity of an elastomeric material of the first gasket and a lower hardness than the first glass sheet.

12. A façade component, comprising a glass window and a secondary frame connected to the glass window by means of a plurality of connectors, wherein:

the glass window comprises a multilayer panel with a first glass layer formed of at least a first glass sheet and a second glass sheet adjacent and glued to each other, a second glass layer formed of at least one glass sheet which is separated and spaced apart from the first glass layer by a sealing spacer extending along a periphery of the multilayer panel, and a gap delimited by the first glass layer, the second glass layer, and the sealing spacer, the secondary frame comprises a plurality of secondary elongated metal profiles combining to form a secondary profile, the secondary elongated metal profiles having a cross section shape which is substantially constant along a longitudinal extension thereof and forming:

an engagement surface facing the glass window, a connection portion, opposite to the engagement surface, for connecting the secondary frame to a primary frame of façade, a first gasket seat formed in the engagement surface and accommodating a first gasket extending along an entire length of the secondary profile and interposed between the engagement surface and the glass window, an engagement seat forming a plurality of engagement holes opening into the engagement surface and each receiving an engagement portion of one of the connectors, respectively, the connectors each comprise an expansion portion anchored in an expansion hole in the first glass layer, a pin connected to the expansion portion and forming the engagement portion, as well as a releasable tightening member which engages the engagement portion of the connector and the engagement seat of the secondary frame and tightens the glass window against the secondary frame, wherein the expansion hole and the expansion portion extend through the first glass sheet bordering with the secondary frame and into the second glass sheet adjacent to the first glass sheet on a side opposite to the secondary frame, wherein the expansion hole and the expansion portion have at least one local widening which creates an anti-extraction shape coupling between the connector and the first glass layer, wherein the engagement seat forms an engagement channel open towards a side opposite to the engagement surface and delimited by two side walls and a bottom wall in which the engagement holes are formed, and wherein the engagement channel is closable and openable by a closing plate, and an outer wall of the side walls of the engagement channel forms an outer wall of the secondary profile so that the engagement channel, closed by the closing plate, forms a closed heat-insulating cell.

* * * * *